United States Patent
Ferguson et al.

(10) Patent No.: US 10,015,143 B1
(45) Date of Patent: Jul. 3, 2018

(54) METHODS FOR SECURING ONE OR MORE LICENSE ENTITLEMENT GRANTS AND DEVICES THEREOF

(71) Applicant: F5 Networks, Inc., Seattle, WA (US)

(72) Inventors: Jc Ferguson, Harvard, MA (US); Bruce L. Donohue, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 196 days.

(21) Appl. No.: 14/732,476

(22) Filed: Jun. 5, 2015

Related U.S. Application Data (60) Provisional application No. 62/008,406, filed on Jun. 5, 2014.

(51) Int. Cl.
- *H04L 29/06* (2006.01)
- *H04L 9/14* (2006.01)
- *H04L 9/32* (2006.01)

(52) U.S. Cl.
CPC .......... *H04L 63/0428* (2013.01); *H04L 9/14* (2013.01); *H04L 9/3247* (2013.01); *H04L 2209/24* (2013.01); *H04L 2209/72* (2013.01)

(58) Field of Classification Search
CPC ..... H04L 63/0428; H04L 9/14; H04L 9/3247; H04L 2209/24; H04L 2209/72
See application file for complete search history.

(56) References Cited

U.S. PATENT DOCUMENTS

| | | | |
|---|---|---|---|
| 3,115,802 A | 12/1963 | Sweeny | |
| 3,950,735 A | 4/1976 | Patel | |
| 4,644,532 A | 2/1987 | George et al. | |
| 4,897,781 A | 1/1990 | Chang et al. | |
| 4,965,772 A | 10/1990 | Daniel et al. | |
| 5,023,826 A | 6/1991 | Patel | |
| 5,053,953 A | 10/1991 | Patel | |
| 5,167,024 A | 11/1992 | Smith et al. | |

(Continued)

FOREIGN PATENT DOCUMENTS

| | | |
|---|---|---|
| EP | 0 744 850 | 11/1996 |
| EP | 1813084 | 8/2007 |

(Continued)

OTHER PUBLICATIONS

"A Process for Selective Routing of Servlet Content to Transcoding Modules," Research Disclosure 422124, Jun. 1999, pp. 889-890, IBM Corporation.

(Continued)

*Primary Examiner* — Sarah Su
(74) *Attorney, Agent, or Firm* — LeClairRyan PLLC (57) ABSTRACT

Methods, non-transitory computer readable media and application management apparatuses, and application management systems that secure one or more entitlement grants includes transmitting a registration license request encrypted with a first public key to a license server. The registration license request comprises a registration identifier and a second public key. A registration license response is received from the license server. The registration license response comprises one or more license entitlement grants, the second public key, and a first secure signature encrypted with a first private key. The one or more license entitlement grants are authenticated when the first decrypted secure signature matches the first check signature.

24 Claims, 5 Drawing Sheets

(56) References Cited

U.S. PATENT DOCUMENTS

| | | | |
|---|---|---|---|
| 5,299,312 A | 3/1994 | Rocco, Jr. |
| 5,327,529 A | 7/1994 | Fults et al. |
| 5,329,508 A | 7/1994 | Matsueda |
| 5,367,635 A | 11/1994 | Bauer et al. |
| 5,371,852 A | 12/1994 | Attanasio et al. |
| 5,388,237 A | 2/1995 | Sodos |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,742,765 A | 4/1998 | Wong et al. |
| 5,752,023 A | 5/1998 | Choucri et al. |
| 5,761,484 A | 6/1998 | Agarwal et al. |
| 5,761,534 A | 6/1998 | Lundberg et al. |
| 5,768,423 A | 6/1998 | Aref et al. |
| 5,774,660 A | 6/1998 | Brendel et al. |
| 5,790,554 A | 8/1998 | Pitcher et al. |
| 5,797,033 A | 8/1998 | Ecclesine |
| 5,802,052 A | 9/1998 | Venkataraman |
| 5,812,550 A | 9/1998 | Sohn et al. |
| 5,825,772 A | 10/1998 | Dobbins et al. |
| 5,828,835 A | 10/1998 | Isfeld et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 9,939,373 B2 | 8/1999 | Sturm et al. |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. |
| 6,006,264 A | 12/1999 | Colby et al. |
| 9,964,967 B2 | 12/1999 | Milsson et al. |
| 6,026,443 A | 2/2000 | Oskouy et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,115,802 A | 9/2000 | Tock et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,314,408 B1 * | 11/2001 | Salas ............... G06F 17/3089 |
| | | 705/54 |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,529,508 B1 | 3/2003 | Li et al. |
| 6,601,084 B1 | 7/2003 | Bhaskaran et al. |
| 6,614,957 B2 | 9/2003 | Wyeth et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Haley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,700,871 B1 | 3/2004 | Harper et al. |
| 6,708,187 B1 | 3/2004 | Shanumgam et al. |
| 6,718,380 B1 | 4/2004 | Mohaban et al. |
| 6,742,045 B1 | 5/2004 | Albert et al. |
| 6,748,457 B2 | 6/2004 | Fallon et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,781,990 B1 | 8/2004 | Puri et al. |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,820,133 B1 | 11/2004 | Grove et al. |
| 6,826,698 B1 | 11/2004 | Minkin et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hedge |
| 6,904,040 B2 | 4/2005 | Salapura et al. |
| 6,888,836 B1 | 5/2005 | Cherkasova |
| 6,928,082 B2 | 8/2005 | Liu et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,975,592 B1 | 12/2005 | Seddigh et al. |
| 6,986,040 B1 | 1/2006 | Kramer et al. |
| 6,987,763 B2 | 1/2006 | Rochberger et al. |
| 6,999,457 B2 | 2/2006 | Shinohara |
| 7,007,092 B2 | 2/2006 | Peiffer |
| 7,058,633 B1 | 6/2006 | Gnagy et al. |
| 7,065,630 B1 | 6/2006 | Ledebohm et al. |
| 7,107,348 B2 | 9/2006 | Shimada et al. |
| 7,113,993 B1 | 9/2006 | Cappiello et al. |
| 7,117,308 B1 | 10/2006 | Mitten et al. |
| 7,133,944 B2 | 11/2006 | Song et al. |
| 7,139,792 B1 | 11/2006 | Mishra et al. |
| 7,142,540 B2 | 11/2006 | Hendel et al. |
| 7,174,393 B2 | 2/2007 | Boucher et al. |
| 7,185,359 B2 | 2/2007 | Schmidt et al. |
| 7,228,422 B2 | 6/2007 | Morioka et al. |
| 7,236,491 B2 | 6/2007 | Tsao et al. |
| 7,272,150 B2 | 9/2007 | Bly et al. |
| 7,281,030 B1 | 10/2007 | Davis |
| 7,283,470 B1 | 10/2007 | Sindhu et al. |
| 7,295,827 B2 | 11/2007 | Liu et al. |
| 7,308,703 B2 | 12/2007 | Wright et al. |
| 7,308,709 B1 | 12/2007 | Brezak et al. |
| 7,310,339 B1 | 12/2007 | Powers et al. |

(56) References Cited

U.S. PATENT DOCUMENTS

| | | |
|---|---|---|
| 7,319,696 B2 | 1/2008 | Inoue et al. |
| 7,321,926 B1 | 1/2008 | Zhang et al. |
| 7,324,525 B2 | 1/2008 | Fuhs et al. |
| 7,343,413 B2 | 3/2008 | Gilde et al. |
| 7,349,391 B2 | 3/2008 | Ben-Dor et al. |
| 7,353,326 B2 | 4/2008 | Cho et al. |
| 7,355,977 B1 | 4/2008 | Li |
| 7,415,034 B2 | 4/2008 | Muller et al. |
| 7,376,772 B2 | 5/2008 | Fallon |
| 7,383,570 B2 | 6/2008 | Pinkas et al. |
| 7,398,552 B2 | 7/2008 | Pardee et al. |
| 7,403,542 B1 | 7/2008 | Thompson |
| 7,411,957 B2 | 8/2008 | Stacy et al. |
| 7,420,931 B2 | 9/2008 | Nanda et al. |
| 7,433,962 B2 | 10/2008 | Janssen et al. |
| 7,437,478 B2 | 10/2008 | Yokota et al. |
| 7,454,480 B2 | 11/2008 | Labio et al. |
| 7,457,313 B2 | 11/2008 | Patrick |
| 7,333,999 B1 | 12/2008 | Njemanze |
| 7,475,122 B2 | 1/2009 | Azpitarte |
| 7,478,186 B1 | 1/2009 | Onufryk et al. |
| 7,490,162 B1 | 2/2009 | Masters |
| 7,496,689 B2 | 2/2009 | Sharp et al. |
| 7,496,695 B2 | 2/2009 | Go et al. |
| 7,500,028 B2 | 3/2009 | Yamagishi |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,512,078 B2 | 3/2009 | Swain |
| 7,512,721 B1 | 3/2009 | Olson |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,533,197 B2 | 5/2009 | Leonard et al. |
| 7,552,232 B2 | 6/2009 | Helmer, Jr. et al. |
| 7,558,197 B1 | 7/2009 | Sindhu et al. |
| 7,558,910 B2 | 7/2009 | Alverson et al. |
| 7,571,180 B2 | 8/2009 | Minyailov |
| 7,571,299 B2 | 8/2009 | Loeb |
| 7,580,971 B1 | 8/2009 | Gollapudi et al. |
| 7,590,732 B2 | 9/2009 | Rune |
| 7,590,753 B2 | 9/2009 | Wolde et al. |
| 7,620,046 B2 | 11/2009 | Ronciak et al. |
| 7,620,071 B2 | 11/2009 | Makineni et al. |
| 7,621,162 B2 | 11/2009 | Bartky |
| 7,624,424 B2 | 11/2009 | Morita et al. |
| 7,644,137 B2 | 1/2010 | Bozak et al. |
| 7,647,416 B2 | 1/2010 | Chiang et al. |
| 7,657,659 B1 | 2/2010 | Lambeth et al. |
| 7,660,916 B2 | 2/2010 | Moskalev et al. |
| 7,668,166 B1 | 2/2010 | Rekhter et al. |
| 7,668,727 B2 | 2/2010 | Mitchell et al. |
| 7,668,851 B2 | 2/2010 | Triplett |
| 7,689,710 B2 | 3/2010 | Tang et al. |
| 7,706,261 B2 | 4/2010 | Sun et al. |
| 7,710,989 B2 | 5/2010 | Chew |
| 7,724,657 B2 | 5/2010 | Rao et al. |
| 7,725,093 B2 | 5/2010 | Sengupta et al. |
| 7,729,239 B1 | 6/2010 | Aronov et al. |
| 7,734,809 B2 | 6/2010 | Joshi et al. |
| 7,735,099 B1 | 6/2010 | Micalizzi, Jr. |
| 7,742,412 B1 | 6/2010 | Medina |
| 7,778,187 B2 | 8/2010 | Chaturvedi et al. |
| 7,784,093 B2 | 8/2010 | Deng et al. |
| 7,808,913 B2 | 10/2010 | Ansari et al. |
| 7,813,277 B2 | 10/2010 | Okholm et al. |
| 7,826,487 B1 | 11/2010 | Mukerji et al. |
| 7,831,662 B2 | 11/2010 | Clark et al. |
| 7,840,841 B2 | 11/2010 | Huang et al. |
| 7,876,677 B2 | 1/2011 | Cheshire |
| 7,877,524 B1 | 1/2011 | Annem et al. |
| 7,908,314 B2 | 3/2011 | Yamaguchi et al. |
| 7,916,728 B1 | 3/2011 | Mimms |
| 7,925,908 B2 | 4/2011 | Kim |
| 7,930,365 B2 | 4/2011 | Dixit et al. |
| 7,933,496 B2 | 4/2011 | Livshits et al. |
| 7,936,772 B2 | 5/2011 | Kashyap |
| 7,945,908 B1 | 5/2011 | Waldspurger et al. |
| 7,984,141 B2 | 7/2011 | Gupta et al. |
| 7,991,918 B2 | 8/2011 | Uha et al. |
| 7,996,569 B2 | 8/2011 | Aloni et al. |
| 8,006,016 B2 | 8/2011 | Muller et al. |
| 8,041,022 B1 | 10/2011 | Andreasen et al. |
| 8,077,620 B2 | 12/2011 | Solomon et al. |
| 8,099,528 B2 | 1/2012 | Millet et al. |
| 8,103,781 B1 | 1/2012 | Wu et al. |
| 8,103,809 B1 | 1/2012 | Michels et al. |
| 8,112,491 B1 | 2/2012 | Michels et al. |
| 8,112,594 B2 | 2/2012 | Giacomoni et al. |
| 8,130,650 B2 | 3/2012 | Allen, Jr. et al. |
| 8,149,819 B2 | 4/2012 | Kobayashi et al. |
| 8,185,475 B2 * | 5/2012 | Hug ............... G06F 21/10 705/59 |
| 8,189,567 B2 | 5/2012 | Kavanagh et al. |
| 8,199,757 B2 | 6/2012 | Pani et al. |
| 8,205,246 B2 | 6/2012 | Shatzkamer et al. |
| 8,219,609 B1 | 7/2012 | Bhattacharjee et al. |
| 8,233,380 B2 | 7/2012 | Subramanian et al. |
| 8,239,954 B2 | 8/2012 | Wobber et al. |
| 8,274,895 B2 | 9/2012 | Rahman et al. |
| 8,279,865 B2 | 10/2012 | Giacomoni et al. |
| 8,302,169 B1 | 10/2012 | Presoto et al. |
| 8,306,036 B1 | 11/2012 | Bollay et al. |
| 8,321,908 B2 | 11/2012 | Gai et al. |
| 8,346,993 B2 | 1/2013 | Michels et al. |
| 8,351,333 B2 | 1/2013 | Rao et al. |
| 8,380,854 B2 | 2/2013 | Szabo |
| 8,417,817 B1 | 4/2013 | Jacobs |
| 8,447,871 B1 | 5/2013 | Szabo |
| 8,447,884 B1 | 5/2013 | Baumann |
| 8,447,970 B2 | 5/2013 | Klein et al. |
| 8,448,234 B2 | 5/2013 | Mondaeev et al. |
| 8,452,876 B1 | 5/2013 | Williams et al. |
| 8,464,265 B2 | 6/2013 | Worley |
| 8,468,247 B1 | 6/2013 | Richardson et al. |
| 8,468,267 B2 | 6/2013 | Yigang |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,527,758 B2 | 9/2013 | Mansour |
| 8,566,474 B2 | 10/2013 | Kanode et al. |
| 8,578,050 B2 | 11/2013 | Craig et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Glide et al. |
| 8,799,403 B2 | 8/2014 | Chan et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,819,768 B1 | 8/2014 | Koeten et al. |
| 8,830,874 B2 | 9/2014 | Cho et al. |
| 8,848,715 B2 | 9/2014 | Izenberg et al. |
| 8,873,753 B2 | 10/2014 | Parker |
| 8,875,274 B2 | 10/2014 | Montemurro et al. |
| 8,880,632 B1 | 11/2014 | Michels et al. |
| 8,880,696 B1 | 11/2014 | Michels et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 8,984,178 B2 | 3/2015 | Michels et al. |
| 9,032,113 B2 | 5/2015 | Conroy et al. |
| 9,036,529 B2 | 5/2015 | Erickson et al. |
| 9,037,166 B2 | 5/2015 | de Wit et al. |
| 9,047,259 B1 | 6/2015 | Ho et al. |
| 9,077,554 B1 | 7/2015 | Szabo |
| 9,083,760 B1 | 7/2015 | Hughes et al. |
| 9,114,326 B2 | 8/2015 | Johnson et al. |
| 9,172,753 B1 | 10/2015 | Jiang et al. |

(56) References Cited

U.S. PATENT DOCUMENTS

| | | | |
|---|---|---|---|
| 9,246,819 B1 | 1/2016 | Thirasuttakorn | |
| 9,505,712 B2 | 11/2016 | Van Den Tillaart et al. | |
| 9,589,114 B2* | 3/2017 | Strom | G06F 21/121 |
| 9,709,805 B2 | 7/2017 | Weindorf et al. | |
| 9,745,800 B2 | 8/2017 | Poteet, III | |
| 9,905,829 B2 | 2/2018 | Masuda | |
| 9,906,913 B2 | 2/2018 | Ding et al. | |
| 9,910,858 B2 | 3/2018 | Fermum et al. | |
| 2001/0009554 A1 | 7/2001 | Katseff et al. | |
| 2001/0023442 A1 | 9/2001 | Masters | |
| 2002/0010783 A1 | 1/2002 | Primak et al. | |
| 2002/0032777 A1 | 3/2002 | Kawata et al. | |
| 2002/0046291 A1 | 4/2002 | O'Callaghan et al. | |
| 2002/0049842 A1 | 4/2002 | Huetsch et al. | |
| 2002/0059428 A1 | 5/2002 | Susai et al. | |
| 2002/0083067 A1 | 6/2002 | Tamayo et al. | |
| 2002/0095498 A1 | 7/2002 | Chanda et al. | |
| 2002/0112061 A1 | 8/2002 | Shih et al. | |
| 2002/0138615 A1 | 9/2002 | Schmelling | |
| 2002/0156927 A1 | 10/2002 | Boucher et al. | |
| 2002/0161913 A1 | 10/2002 | Gonzalez et al. | |
| 2002/0194342 A1 | 12/2002 | Lu et al. | |
| 2002/0198993 A1 | 12/2002 | Cudd et al. | |
| 2003/0037070 A1 | 2/2003 | Marston | |
| 2003/0046291 A1 | 3/2003 | Fascenda | |
| 2003/0065653 A1 | 4/2003 | Overton et al. | |
| 2003/0065951 A1 | 4/2003 | Igeta et al. | |
| 2003/0067930 A1 | 4/2003 | Salapura et al. | |
| 2003/0069918 A1 | 4/2003 | Lu et al. | |
| 2003/0069974 A1 | 4/2003 | Lu et al. | |
| 2003/0070069 A1 | 4/2003 | Belapurkar et al. | |
| 2003/0086415 A1 | 5/2003 | Bernhard et al. | |
| 2003/0105807 A1 | 6/2003 | Thompson et al. | |
| 2003/0105983 A1 | 6/2003 | Brakmo et al. | |
| 2003/0108052 A1 | 6/2003 | Inoue et al. | |
| 2003/0120948 A1 | 6/2003 | Schmidt et al. | |
| 2003/0128708 A1 | 7/2003 | Inoue et al. | |
| 2003/0145062 A1 | 7/2003 | Sharma et al. | |
| 2003/0145233 A1 | 7/2003 | Poletto et al. | |
| 2003/0163576 A1 | 8/2003 | Janssen et al. | |
| 2003/0188193 A1 | 10/2003 | Vishwanath | |
| 2003/0204636 A1 | 10/2003 | Greenblat et al. | |
| 2003/0208596 A1 | 11/2003 | Carolan et al. | |
| 2003/0225485 A1 | 12/2003 | Fritz et al. | |
| 2004/0003287 A1 | 1/2004 | Zissimopoulos et al. | |
| 2004/0072569 A1 | 4/2004 | Omae et al. | |
| 2004/0103283 A1 | 5/2004 | Hornak | |
| 2001/0111523 | 6/2004 | Hall et al. | |
| 2004/0111621 A1 | 6/2004 | Himberger et al. | |
| 2004/0117493 A1 | 6/2004 | Bazot et al. | |
| 2004/0151186 A1 | 8/2004 | Akama | |
| 2004/0192312 A1 | 9/2004 | Li | |
| 2004/0199762 A1 | 10/2004 | Carlson et al. | |
| 2004/0202161 A1 | 10/2004 | Stachura et al. | |
| 2004/0210663 A1 | 10/2004 | Phillips et al. | |
| 2004/0243808 A1* | 12/2004 | Ishiguro | G06F 21/10 713/176 |
| 2004/0249881 A1 | 12/2004 | Uha et al. | |
| 2004/0249948 A1 | 12/2004 | Sethi et al. | |
| 2004/0255000 A1 | 12/2004 | Simionescu et al. | |
| 2004/0264472 A1 | 12/2004 | Oliver et al. | |
| 2004/0264481 A1 | 12/2004 | Darling et al. | |
| 2004/0267897 A1 | 12/2004 | Hill et al. | |
| 2004/0267920 A1 | 12/2004 | Hydrie et al. | |
| 2004/0267948 A1 | 12/2004 | Oliver et al. | |
| 2004/0268358 A1 | 12/2004 | Darling et al. | |
| 2005/0004887 A1 | 1/2005 | Igakura et al. | |
| 2005/0005133 A1 | 1/2005 | Xia et al. | |
| 2005/0007991 A1 | 1/2005 | Ton et al. | |
| 2005/0021736 A1 | 1/2005 | Carusi et al. | |
| 2005/0027869 A1 | 2/2005 | Johnson | |
| 2005/0044213 A1 | 2/2005 | Kobayashi et al. | |
| 2005/0052440 A1 | 3/2005 | Kim et al. | |
| 2005/0055435 A1 | 3/2005 | Gbadegesin et al. | |
| 2005/0071283 A1 | 3/2005 | Randle et al. | |
| 2005/0078604 A1 | 4/2005 | Yim | |
| 2005/0083952 A1 | 4/2005 | Swain | |
| 2005/0114559 A1 | 5/2005 | Miller | |
| 2005/0122942 A1 | 6/2005 | Rhee et al. | |
| 2005/0122977 A1 | 6/2005 | Lieberman | |
| 2005/0154837 A1 | 7/2005 | Keohane et al. | |
| 2005/0175014 A1 | 8/2005 | Patrick | |
| 2005/0187866 A1 | 8/2005 | Lee | |
| 2005/0188220 A1 | 8/2005 | Nilsson et al. | |
| 2005/0198310 A1 | 9/2005 | Kim et al. | |
| 2005/0213570 A1 | 9/2005 | Stacy et al. | |
| 2005/0262238 A1 | 11/2005 | Reeves et al. | |
| 2005/0288939 A1 | 12/2005 | Peled et al. | |
| 2006/0007928 A1 | 1/2006 | Sangillo | |
| 2006/0031520 A1 | 2/2006 | Bedekar et al. | |
| 2006/0036764 A1 | 2/2006 | Yokota et al. | |
| 2006/0059267 A1 | 3/2006 | Cugi et al. | |
| 2006/0067349 A1 | 3/2006 | Ronciak et al. | |
| 2006/0077902 A1 | 4/2006 | Kannan et al. | |
| 2006/0077986 A1 | 4/2006 | Rune | |
| 2006/0083205 A1 | 4/2006 | Buddhikot et al. | |
| 2006/0095573 A1 | 5/2006 | Carle et al. | |
| 2006/0104303 A1 | 5/2006 | Makineni et al. | |
| 2006/0106802 A1 | 5/2006 | Giblin et al. | |
| 2006/0112176 A1 | 5/2006 | Liu et al. | |
| 2006/0112272 A1 | 5/2006 | Morioka et al. | |
| 2006/0129684 A1 | 6/2006 | Datta | |
| 2006/0135198 A1 | 6/2006 | Lee | |
| 2006/0156416 A1 | 7/2006 | Huotari et al. | |
| 2006/0161577 A1 | 7/2006 | Kulkrni et al. | |
| 2006/0168070 A1 | 7/2006 | Thompson et al. | |
| 2006/0171365 A1 | 8/2006 | Borella | |
| 2006/0179153 A1 | 8/2006 | Lee et al. | |
| 2006/0182103 A1 | 8/2006 | Martini et al. | |
| 2006/0184647 A1 | 8/2006 | Dixit et al. | |
| 2006/0209853 A1 | 9/2006 | Hidaka et al. | |
| 2006/0221832 A1 | 10/2006 | Muller et al. | |
| 2006/0221835 A1 | 10/2006 | Sweeney | |
| 2006/0230148 A1 | 10/2006 | Forecast et al. | |
| 2006/0233106 A1 | 10/2006 | Achlioptas et al. | |
| 2006/0235996 A1 | 10/2006 | Wolde et al. | |
| 2006/0242300 A1 | 10/2006 | Yumoto et al. | |
| 2006/0253583 A1 | 11/2006 | Dixon | |
| 2006/0268704 A1 | 11/2006 | Ansari et al. | |
| 2003/0294054 | 12/2006 | Kudo et al. | |
| 2006/0288128 A1 | 12/2006 | Moskalev et al. | |
| 2006/0291483 A1 | 12/2006 | Sela | |
| 2006/0294054 A1 | 12/2006 | Kudo et al. | |
| 2007/0006293 A1 | 1/2007 | Balakrishnan et al. | |
| 2007/0016662 A1 | 1/2007 | Desai et al. | |
| 2007/0019658 A1 | 1/2007 | Park et al. | |
| 2007/0297410 A1 | 2/2007 | Yoon et al. | |
| 2007/0050843 A1 | 3/2007 | Manville et al. | |
| 2007/0058670 A1 | 3/2007 | Konduru et al. | |
| 2007/0064661 A1 | 3/2007 | Sood et al. | |
| 2007/0083646 A1 | 4/2007 | Miller et al. | |
| 2007/0087756 A1 | 4/2007 | Hoffberg | |
| 2007/0088822 A1 | 4/2007 | Coile et al. | |
| 2007/0106796 A1 | 5/2007 | Kudo et al. | |
| 2007/0107048 A1 | 5/2007 | Halls et al. | |
| 2007/0118879 A1 | 5/2007 | Yeun | |
| 2007/0174491 A1 | 7/2007 | Still et al. | |
| 2007/0219917 A1* | 9/2007 | Liu | G06F 21/10 705/59 |
| 2007/0220598 A1 | 9/2007 | Salowey et al. | |
| 2007/0233809 A1 | 10/2007 | Brownell et al. | |
| 2007/0258451 A1 | 11/2007 | Bouat | |
| 2007/0297551 A1 | 12/2007 | Choi | |
| 2008/0008202 A1 | 1/2008 | Terrell et al. | |
| 2008/0010207 A1* | 1/2008 | Yanagihara | H04L 9/0836 705/51 |
| 2008/0025297 A1 | 1/2008 | Kashyap | |
| 2008/0031258 A1 | 2/2008 | Acharya et al. | |
| 2008/0034136 A1 | 2/2008 | Ulenas | |
| 2008/0059797 A1* | 3/2008 | Tokuno | H04L 63/0853 713/171 |
| 2008/0072303 A1 | 3/2008 | Syed | |
| 2008/0101596 A1 | 5/2008 | Cerruti et al. | |
| 2008/0120370 A1 | 5/2008 | Chan et al. | |

(56) References Cited

U.S. PATENT DOCUMENTS

| | | |
|---|---|---|
| 2008/0126509 A1 | 5/2008 | Subramanian et al. |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0165801 A1 | 7/2008 | Sheppard |
| 2008/0177994 A1 | 7/2008 | Mayer |
| 2008/0178278 A1 | 7/2008 | Grinstein et al. |
| 2008/0184248 A1 | 7/2008 | Barua et al. |
| 2008/0201599 A1 | 8/2008 | Ferraiolo et al. |
| 2008/0205613 A1 | 8/2008 | Lopez |
| 2008/0219279 A1 | 9/2008 | Chew |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0235508 A1 | 9/2008 | Ran et al. |
| 2008/0239986 A1 | 10/2008 | Xu et al. |
| 2008/0253395 A1 | 10/2008 | Pandya |
| 2008/0256224 A1 | 10/2008 | Kaji et al. |
| 2008/0279200 A1 | 11/2008 | Shatzkamer et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0003204 A1 | 1/2009 | Okholm et al. |
| 2009/0016217 A1 | 1/2009 | Kashyap |
| 2009/0028337 A1 | 1/2009 | Balabine et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0089619 A1 | 4/2009 | Huang et al. |
| 2009/0094610 A1 | 4/2009 | Sukirya |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0157678 A1 | 6/2009 | Turk |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0222598 A1 | 9/2009 | Hayden |
| 2009/0228956 A1 | 9/2009 | He et al. |
| 2009/0248893 A1 | 10/2009 | Richardson et al. |
| 2009/0248911 A1 | 10/2009 | Conroy et al. |
| 2009/0287935 A1 | 11/2009 | Aull et al. |
| 2009/0296624 A1 | 12/2009 | Ryu et al. |
| 2009/0300407 A1 | 12/2009 | Kamath et al. |
| 2010/0011434 A1 | 1/2010 | Kay |
| 2010/0017627 A1* | 1/2010 | Princen .................. G06F 21/10 713/193 |
| 2010/0017846 A1 | 1/2010 | Huang et al. |
| 2010/0071048 A1 | 3/2010 | Novak et al. |
| 2010/0082849 A1 | 4/2010 | Millet et al. |
| 2010/0094945 A1 | 4/2010 | Chan et al. |
| 2010/0115236 A1 | 5/2010 | Bataineh et al. |
| 2010/0122091 A1 | 5/2010 | Huang et al. |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0188976 A1 | 7/2010 | Rahman et al. |
| 2010/0189052 A1 | 7/2010 | Kavanagh |
| 2010/0191974 A1* | 7/2010 | Dubhashi ................ G06F 21/10 713/176 |
| 2010/0242092 A1 | 9/2010 | Harris et al. |
| 2010/0251330 A1 | 9/2010 | Kroeselberg et al. |
| 2010/0279733 A1 | 11/2010 | Karsten et al. |
| 2010/0299451 A1 | 11/2010 | Yigang et al. |
| 2010/0322250 A1 | 12/2010 | Shelly et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0087888 A1 | 4/2011 | Rennie |
| 2011/0090541 A1 | 4/2011 | Harper |
| 2011/0107077 A1 | 5/2011 | Henderson et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0197059 A1 | 8/2011 | Klein et al. |
| 2011/0202676 A1 | 8/2011 | Craig et al. |
| 2011/0246800 A1 | 10/2011 | Accpadi et al. |
| 2011/0273984 A1 | 11/2011 | Hsu et al. |
| 2011/0277016 A1 | 11/2011 | Hockings et al. |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0079055 A1 | 3/2012 | Robinson |
| 2012/0101952 A1 | 4/2012 | Raleigh et al. |
| 2012/0124372 A1 | 5/2012 | Dilley et al. |
| 2012/0191800 A1 | 7/2012 | Michels et al. |
| 2012/0191847 A1 | 7/2012 | Nas et al. |
| 2012/0198043 A1 | 8/2012 | Hesketh et al. |
| 2012/0224531 A1 | 9/2012 | Karuturi et al. |
| 2012/0311153 A1 | 12/2012 | Morgan |
| 2012/0317266 A1 | 12/2012 | Abbott |
| 2013/0029726 A1 | 1/2013 | Berionne et al. |
| 2013/0031060 A1 | 1/2013 | Loweiy et al. |
| 2013/0054433 A1 | 2/2013 | Giard |
| 2013/0055367 A1 | 2/2013 | Kshirsagar |
| 2013/0067546 A1 | 3/2013 | Thavasi |
| 2013/0091002 A1 | 4/2013 | Christie et al. |
| 2013/0163758 A1 | 6/2013 | Swaminathan et al. |
| 2013/0198322 A1 | 8/2013 | Oran et al. |
| 2013/0205361 A1 | 8/2013 | Narayanaswamy et al. |
| 2013/0262873 A1 | 10/2013 | Read |
| 2013/0282589 A1 | 10/2013 | Shoup |
| 2013/0336122 A1 | 12/2013 | Baruah et al. |
| 2014/0032695 A1 | 1/2014 | Michels et al. |
| 2014/0040478 A1 | 2/2014 | Hsu et al. |
| 2014/0059678 A1 | 2/2014 | Parker |
| 2014/0095661 A1 | 4/2014 | Knowles et al. |
| 2014/0162705 A1 | 6/2014 | de Wit et al. |
| 2014/0171089 A1 | 6/2014 | Janakiraman et al. |
| 2014/0185422 A1 | 7/2014 | Newman et al. |
| 2014/0250535 A1* | 9/2014 | Qu .......................... G06F 21/10 726/26 |
| 2014/0269484 A1 | 9/2014 | Dankberg et al. |
| 2014/0301207 A1 | 10/2014 | Durand et al. |
| 2014/0317404 A1 | 10/2014 | Carlson et al. |

FOREIGN PATENT DOCUMENTS

| | | |
|---|---|---|
| WO | WO 00/04422 | 1/2000 |
| WO | WO 00/04458 | 1/2000 |
| WO | WO 2004/079930 | 9/2004 |
| WO | WO 2006/055494 | 5/2006 |
| WO | WO 2007/040858 | 4/2007 |
| WO | WO 2009/158680 | 12/2009 |

OTHER PUBLICATIONS

"Chapter 15, Memory Mapping and DMA," Memory Management in Linux, ch15.13676, accessed on Jan. 25, 2005, pp. 412-463.

"Plan 9 kernel history: overview/file list/diff list," http://switch.com/cgi-bin/plan9history.cgi?f=2001/0126/pc/etherga620.com, accessed Oct. 22, 2007, pp. 1-16.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

(56) References Cited

OTHER PUBLICATIONS

Alteon Websystems Inc., "Gigabit Ethernet/PCI Network Interface Card; Host/NIC Software Interface Definition," Jul. 1999, pp. 1-80, Revision 12.4.13, P/N 020001, San Jose, California.

Cavium Networks, "Cavium Networks Product Selector Guide—Single & Multi-Core MIPS Processors, Security Processors and Accelerator Boards," 2008, pp. 1-44, Mountain View, CA, US.

Cavium Networks, "NITROX™ XL Security Acceleration Modules PCI 3V or 3V/5V—Universal Boards for SSL and IPSec," at http://www.Caviumnetworks.com, 2002, p. 1, Mountain View, CA USA.

Cavium Networks, "PCI, PCI-X" at (http://www.cavium.com/acceleration_boards_PCI_PCI-X.htm (Downloaded Oct. 2008), Cavium Networks—Products>Acceleration Boards>PCI,PCI-X).

Chong et al, "Two-Factor Face Authentication: Topographic Independent Component Analysis (TICA) and Multispace Random Projection (MRP)", International Conference of Soft Computing and Pattern Recognition, 2009, http://ieeexplore.ieee.org/stamp/stamp.jsp?arnumber=5368670.

Comtech AHA Corporation, "Comtech AHA Announces 3.0 Gbps GZIP Compression/Decompression Accelerator AHA362-PCIX offers highspeed GZIP compression and decompression," www.aha.com, Apr. 20, 2005, pp. 1-2, Moscow, ID, USA.

Comtech AHA Corporation, "Comtech AHA Announces GZIP Compression/Decompression IC offers the highest-speed and compression ration performance in hardware on the market," www.aha.com, Jun. 26, 2007, pp. 1-2, Moscow, ID, USA.

Crescendo Networks, "Application Layer Processing (ALP)", 2003-2009, pp. 168-186, Chapter 9, CN-5000E/5500E, Foxit Software Company.

Eventhelix, "DMA and Interrupt Handling," http://eventhelix.com/RealtimeMantra/FaultHandling/dma_interrupt_handling.htm, Jan. 29, 2010, pp. 1-4, EventHelix.com.

Eventhelix, "TCP—Transmission Control Protocol (TCP Fast Retransmit and Recovery)," Mar. 28, 2002, pp. 105, EventHelix.com.

F5 Networks Inc., "BIG-IP® Access Policy Manager® Application Access Guide," Aug. 17, 2011, pp. 1-24, Version 11.0, F5 Networks, Inc.

F5 Networks Inc., "BIG-IP® Access Policy Manager® Network Access Configuration Guide," Nov. 15, 2011, pp. 1-58, Version 11.1, F5 Networks, Inc.

F5 Networks Inc., "BIG-IP® Access Policy Manager® Portal Access Guide," Nov. 15, 2011, pp. 1-38, Version 11.1, F5 Networks, Inc.

F5 Networks Inc., "BIG-IP® Access Policy Manager® Single Sign-On Configuration Guide," Nov. 15, 2011, pp. 1-38, Version 11.1, F5 Networks, Inc.

F5 Networks Inc., "BIG-IP® Access Policy Manager®, Authentication Configuration Guide," Nov. 15, 2011, pp. 1-68, Version 11.1, F5 Networks, Inc.

F5 Networks Inc., "Configuration Guide for BIG-IP® Access Policy Manager®", Oct. 14, 2013, pp. 1-436, Version 11.1, F5 Networks, Inc.

F5 Networks Inc., "Configuration Guide for Local Traffic Management," F5 Networks Inc., Jan. 2006, version 9.2.2, 406 pgs.

F5 Networks, Inc., "BIP-IP Controller with Exclusive OneConnect Content Switching Feature Provides a Breakthrough System for Maximizing Server and Network Performance," Press Release, May 8, 2001, 2 ages, Las Vegas, Nevada.

F5 Networks, Inc., "SOL11199: Creating a High Availability LDAP Authentication Configuration," pp. 1-3, retrieved from http://support.f5.com/kb/en-us/solutions/public/11000/100/sol11199.print.html on Feb. 27, 2014.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176.

Floyd et al., "Random Early Detection Gateways for Congestion Avoidance," Aug. 1993, pp. 1-22, IEEE/ACM Transactions on Networking, California.

Harvey et al., "DMA Fundamentals on Various PC Platforms," Application Note 011, Apr. 1991, pp. 1-20, National Instruments Corporation.

Hazelwood et al., "Improved Grid Security Posture through Multi-factor Authentication", 12th IEEE/ACM International Conference on Grid Computing (GRID), 2011, http://ieeexplore.ieee.org/stamp/stamp.jsp?arnumber=6076505.

Hochmuth, Phil, "F5, CacheFlow pump up content-delivery lines," Network World Fusion, May 4, 2001, 1 page, Las Vegas, Nevada.

International Search Report and Written Opinion, for PCT/US2011/058469 (dated May 30, 2012) 10 pages.

International Search Report and Written Opinion for PCT/US2012/022996 (dated May 30, 2012) 12 pages.

International Search Report and Written Opinion for PCT/US2013/026615 (dated Jul. 4, 2013) 10 pages.

Macvittie, Lori, "Message-Based Load Balancing," Technical Brief, Jan. 2010, pp. 1-9, F5 Networks, Inc.

Mangino, John, "Using DMA with High Performance Peripherals to Maximize System Performance," WW TMS470 Catalog Applications, SPNA105 Jan. 2007, pp. 1-23.

Mogul, Jeffrey C., "The Case for Persistent-Connection HTTP," SIGCOMM '95, Digital Equipment Corporation Western Research Laboratory, 1995, pp. 1-15, Cambridge, Maine.

Mohammed et al., "A Multi-Level of Multi Factors Authentication Model for Online Banking Services," 2013 International Conference on Computing, Electrical and Electronics Engineering (ICCEEE), http://ieeexploreieee.org/stamp/stampjsp?arnumber=56633936.

Owasp, "Testing for Cross Site Scripting", Owasp Testing Guide v2, Table of Contents, Feb. 24, 2011, pp. 1-5, (www.owasp.org/index.php/Testing_for_Cross_site)scripting).

Rabinovich et al., "DHTTP: An Efficient and Cache-Friendly Transfer Protocol for the Web," IEEE/ACM Transactions on Networking, Dec. 2004, pp. 107-1020, vol. 12, No. 6.

Salchow, Jr., KJ, "Clustered Multiprocessing: Changing the Rules of the Performance Game," F5 White Paper, Jan. 2008, pp. 1-11, F5 Networks, Inc.

Stevens, W., "TCP Slow Start, Congestion Avoidance, Fast Retransmit, and Fast Recovery Algorithms," Network Working Group, RFC 2001, Jan. 1997, pp. 1-6.

Traore et al., "Combining Mouse and Keystroke Dynamics Biometrics for Risk-Based/Authentication in Web Environments", 2012 Fourth International Conference on Digital Home (ICDH), http://ieeexplore.ieee.org/stamp/stamp.jsp?arnumber=6376399.

Wadge, Wallace, "Achieving Gigabit Performance on Programmable Ethernet Network Interface Cards," May 29, 2001, pp. 1-9.

Welch, Von, "A User's Guide to TCP Windows," http://www.vonwelch.com/reports/tcp_windows, updated 1996, last accessed Jan. 29, 2010, pp. 1-5.

Wikipedia, "Direct memory access," http://en.wikipedia.org/wiki/Direct_memory_access, accessed Jan. 29, 2010, pp. 1-6.

Bell Laboratories, "Layer 4/7 Switching and Other Custom IP Traffic Processing Using the NEPPI API," Bell Laboratories, Lucent Technologies, Murray Hill, NJ 07974 USA, pp. 1-11 (2000).

Wikipedia, "Nagle's algorithm," https://en.wikipedia.org/wiki/Nagle%27s_algorithm 2 Pages. Dec. 14, 2014.

\* cited by examiner

METHODS FOR SECURING ONE OR MORE LICENSE ENTITLEMENT GRANTS AND DEVICES THEREOF

This application claims the benefit of U.S. Provisional Patent Application Ser. No. 62/008,406, filed Jun. 5, 2014, which is hereby incorporated by reference in its entirety.

FIELD

This technology relates to methods, non-transitory computer readable media and devices that assist with securing one or more entitlement grants.

BACKGROUND

Typically, a multi-tier licensing system has a corporate run entity management device along with a customer premise entity device which ultimately issues licenses to client devices. Since these devices are at the customer site, there is an enhanced risk that a nefarious person might try and change entitlements in the license or licenses which have been purchased, e.g. by adding more licenses, changing the license content, or adding more client devices to licenses. Accordingly, there is a need for better security on for license entitlement grants.

SUMMARY

A method for securing one or more entitlement grants includes transmitting, by an application management computing device, a registration license request encrypted with a first public key to a license server. The registration license request comprises a registration identifier and a second public key. A registration license response is received, by the application management computing device, from the license server. The registration license response comprises one or more license entitlement grants, the second public key, and a first secure signature encrypted with a first private key. The first secure signature is based on at least the one or more license entitlement grants. A first check signature is generated, by the application management computing device, based on at least the one or more license entitlement grants. The first encrypted secure signature is decrypted, by the application management computing device, with the first public key to obtain the first decrypted secure signature. The one or more license entitlement grants are authenticated and integrity is proved, by the application management computing device, when the first decrypted secure signature matches the first check signature. If the signature does not match, the application management computing device rejects the license as tampered.

An application management computing device includes at least one of configurable hardware logic configured to be capable of implementing or a processor coupled to a memory and configured to execute programmed instructions stored in the memory includes transmitting a registration license request encrypted with a first public key to a license server. The registration license request comprises a registration identifier and a second public key. A registration license response is received from the license server. The registration license response comprises one or more license entitlement grants, the second public key, and a first secure signature encrypted with a first private key. The first secure signature is based on at least the one or more license entitlement grants. A first check signature is generated based on at least the one or more license entitlement. The first encrypted secure signature is decrypted with the first public key to obtain the first decrypted secure signature. The one or more license entitlement grants are authenticated and integrity is proved when the first decrypted secure signature matches the first check signature.

A non-transitory computer readable medium having stored thereon instructions for securing one or more entitlement grants comprising machine executable code which when executed by a processor, causes the processor to perform steps includes transmitting a registration license request encrypted with a first public key to a license server. The registration license request comprises a registration identifier and a second public key. A registration license response is received from the license server. The registration license response comprises one or more license entitlement grants, the second public key, and a first secure signature encrypted with a first private key. The first secure signature is based on at least the one or more license entitlement grants. A first check signature is generated based on at least the one or more license entitlement grants. The first encrypted secure signature is decrypted with the first public key to obtain the first decrypted secure signature. The one or more license entitlement grants are authenticated and integrity is proved when the first decrypted secure signature matches the first check signature.

A method for securing one or more entitlement grants includes receiving, by a client computing device, an updated license response comprising one or more license entitlement grants, a second public key, a first secure signature encrypted with a first private key, a dossier and a second secure signature encrypted with a second private key. A second check signature is generated based on at least the one or more license entitlement grants. The second encrypted secure signature is decrypted, by the client computing device, with the second public key to obtain the second decrypted secure signature. The decrypted second secure signature is authenticated, by the client computing device, when the second decrypted secure signature matches the second check signature. A client computing device includes at least one of configurable hardware logic configured to be capable of implementing or a processor coupled to a memory and configured to execute programmed instructions stored in the memory includes receiving an updated license response comprising one or more license entitlement grants, a second public key, a first secure signature encrypted with a first private key, a dossier and a second secure signature encrypted with a second private key. A second check signature is generated based on at least the one or more license entitlement grants. The second encrypted secure signature is decrypted with the second public key to obtain the second decrypted secure signature. The decrypted second secure signature is authenticated when the second decrypted secure signature matches the second check signature.

A non-transitory computer readable medium having stored thereon instructions for securing one or more entitlement grants comprising machine executable code which when executed by a processor, causes the processor to perform steps includes receiving an updated license response comprising one or more license entitlement grants, a second public key, a first secure signature encrypted with a first private key, a dossier and a second secure signature encrypted with a second private key. A second check signature is generated based on at least the one or more license entitlement grants. The second encrypted secure signature is decrypted with the second public key to obtain the second decrypted secure signature. The decrypted second secure signature is authenticated when the second decrypted secure signature matches the second check signature.

This technology provides a number of advantages including providing methods, non-transitory computer readable media, and devices that more effectively secure one or more license entitlement grants. Additionally, this technology enables a customer side product in an environment outside of the vendor's operational control that needs to serve as a second tier licensing entity (such as by way of example only the application management computing device illustrated and described herein) to provide tamper-free product/instance licenses. This technology also adds another level of security using private and public keys in manners that prevents the second public key from being replaced in order to alter the license entitlements in the customer premises without requiring any additional communication with the license server beyond what is currently needed, e.g., one per license activation. Further, this technology is able to log and monitor information, e.g. any attempts to tamper with the license entitlements, use of invalid keys, or an invalid dossier, for the purpose of auditing for any potential breach, attempted breach, or actual breach of security.

DETAILED DESCRIPTION

Figure 1:
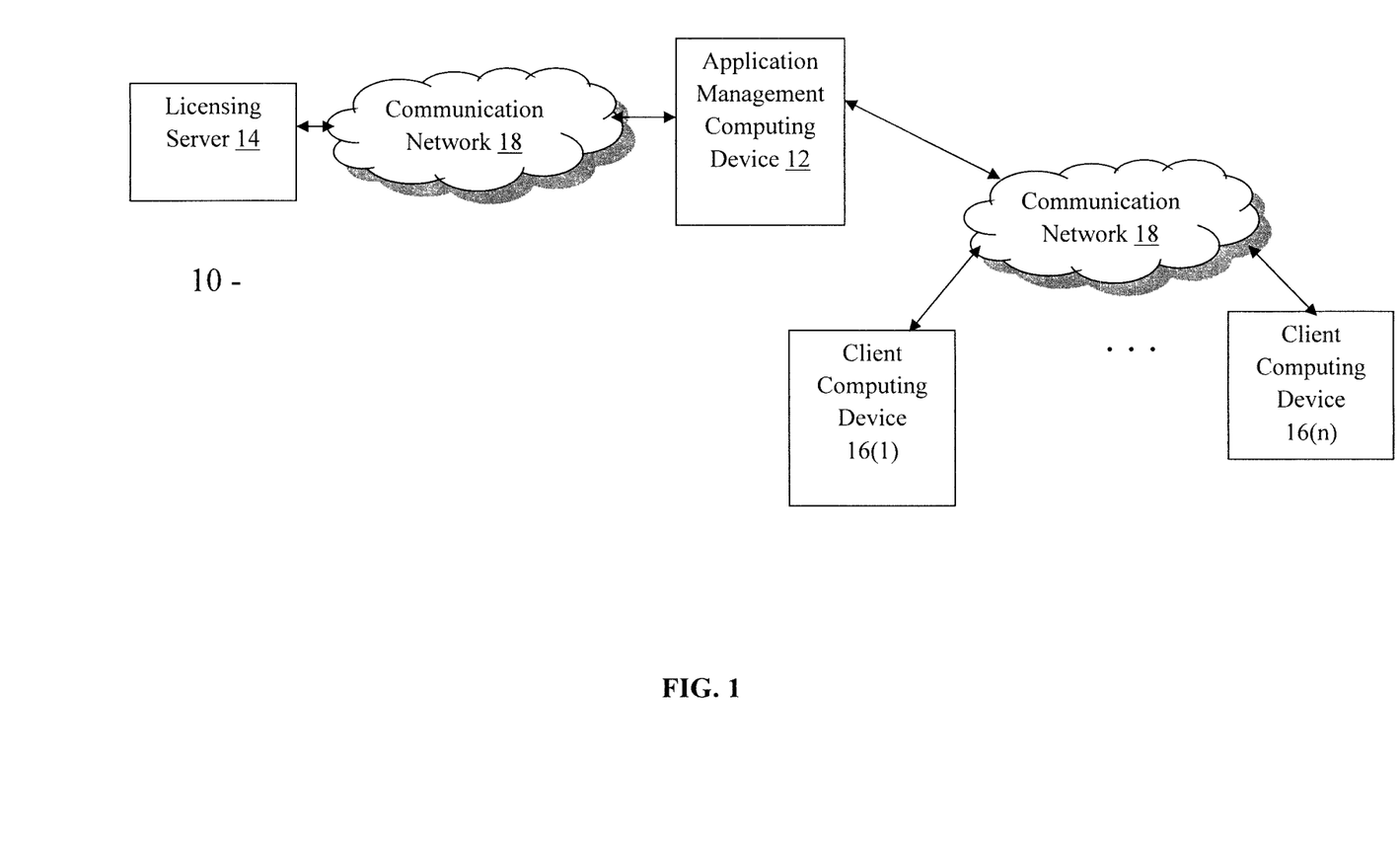
FIG. 1 is block diagram of an example of a network environment with an application management computing device, license server and a plurality of client computing devices.
Figure 2A:
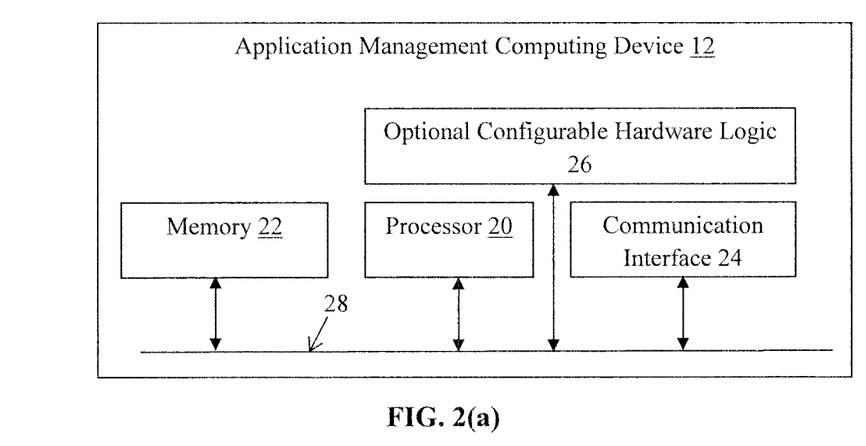
FIG. 2(a) is a block diagram of an example of the application management computing device illustrated in FIG. 1.
Figure 2B:
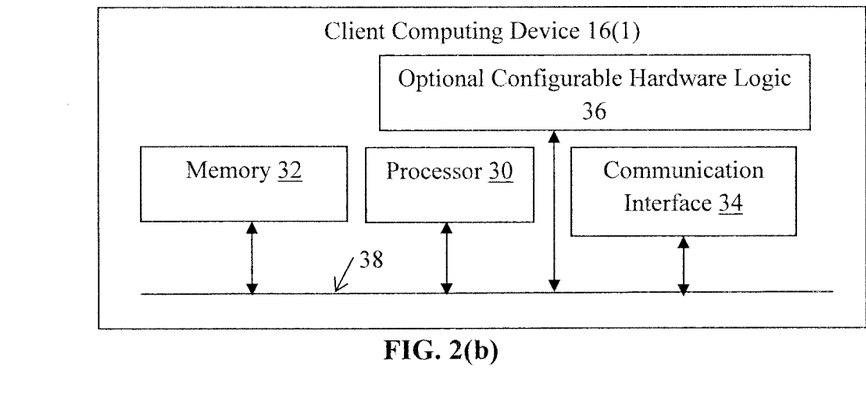
FIG. 2(b) is a block diagram of an example of one of the plurality of client computing devices.

An example of a network environment 10 with an application management computing device 12, a license server 14, and a plurality of client computing devices 16(1)-16(n) is illustrated in FIGS. 1-2(b), although this environment can include other types and numbers of systems, devices, components, and/or elements in other configurations. This technology provides a number of advantages including providing more effective methods, non-transitory computer readable medium, and devices that more effectively and efficiently secure one or more license entitlement grants.

The application management computing device 12 may perform a number of different types of functions, including by way of example managing one or more aspects of securing one or more entitlement grants. The application management computing device 12 in this example includes a processor 20, a memory 22, a communication interface 24, and optional configurable hardware logic 26, which are coupled together by a bus 28 or other link, although other numbers and types of systems, devices, components, and elements in other configurations and locations can be used. The processor 20 in the application management computing device 12 may execute a program of stored instructions for one or more aspects of the present technology as described and illustrated by way of the examples herein, although other types and numbers of processing devices and logic could be used and the processor 20 could execute other numbers and types of programmed instructions.

The memory 22 in the application management computing device 12 may store these programmed instructions for one or more aspects of the present technology as described and illustrated herein, although some or all of the programmed instructions could be stored and/or executed elsewhere. A variety of different types of memory storage devices, such as a random access memory (RAM) and/or read only memory (ROM) in the application management computing device 12 or a floppy disk, hard disk, CD ROM, DVD ROM, or other computer readable medium which is read from and written to by a magnetic, optical, or other reading and writing system that is coupled to the processor 20 in the application management computing device 12, can be used for the memory 22.

The communication interface 24 of the application management computing device 12 operatively couples and facilitates communication with the license server 14 and/or one or more of the client computing devices 16(1)-16(n) via one or more of the communications networks, although other types and numbers of communication networks 18 or systems with other types and numbers of connections and configurations can be used. By way of example only, the one or more communication networks 18 may use TCP/IP over Ethernet and industry-standard protocols, including NFS, CIFS, SOAP, XML, LDAP, and/or SNMP, although other types and numbers of communication networks 18, such as a direct connection, a local area network, a wide area network, each having their own communications protocols, can be used.

The optional configurable hardware logic 26 of the application management computing device 12 may comprise specialized hardware configured to be capable of implementing one or more steps of this technology as illustrated and described with reference to the examples herein. By way of example only, the optional configurable logic 26 may comprise one or more of field programmable gate arrays (FPGAs), field programmable logic devices (FPLDs), application specific integrated circuits (ASICs) and/or programmable logic units (PLUs).

The license server 14 may perform a number of different types of functions, including by way of example securely managing registration identifiers and license entitlement grants. The license server 14 in this example includes a processor, a memory, and a communication interface which are coupled together by a bus or other link and may be configured to be capable of executing a program of stored instructions for one or more aspects of the present technology as described and illustrated by way of the examples herein, although other numbers and types of devices could also be used.

In this particular example, each of the plurality of client computing devices 16(1)-16(n) in this example may include a processor 30, a memory 32, a communication interface 34, and optional configurable hardware logic 36 which are coupled together by a bus 38 or other link, although each of the plurality of client computing devices 16(1)-16(n) could other numbers and types of systems, devices, components, and elements in other configurations. For ease of illustration only one client computing device 16(1) is illustrated in FIG. 2(b) since client computing devices 16(2)-16(n) are the same in structure and operation as client computing device 16(1) in this particular example, although each could have different structures and/or operations. The processor 30 in each of the plurality of client computing devices 16(1)-16(n) may execute a program of stored instructions for one or more aspects of the present technology as described and illustrated by way of the examples herein, although other types and numbers of processing devices and logic could be used and the processor 30 could execute other numbers and types of programmed instructions.

The memory 32 in each of the plurality of client computing devices 16(1)-16(n) may store these programmed instructions for one or more aspects of the present technology as described and illustrated herein, although some or all of the programmed instructions could be stored and/or executed elsewhere. A variety of different types of memory storage devices, such as a random access memory (RAM) and/or read only memory (ROM) in the application management computing device 12 or a floppy disk, hard disk, CD ROM, DVD ROM, or other computer readable medium which is read from and written to by a magnetic, optical, or other reading and writing system that is coupled to the processor 30 in each of the plurality of client computing devices 16(1)-16(n), can be used for the memory 32.

The communication interface 34 in each of the plurality of client computing devices 16(1)-16(n) operatively couples and facilitates communication with the application management computing device 12 and/or license server 14 via one or more of the communications networks, although other types and numbers of communication networks 18 or systems with other types and numbers of connections and configurations can be used. By way of example only, the one or more communication networks 18 may use TCP/IP over Ethernet and industry-standard protocols, including NFS, CIFS, SOAP, XML, LDAP, and/or SNMP, although other types and numbers of communication networks 18, such as a direct connection, a local area network, a wide area network, each having their own communications protocols, can be used.

The optional configurable hardware logic 36 in each of the plurality of client computing devices 16(1)-16(n) may comprise specialized hardware configured to be capable of implementing one or more steps of this technology as illustrated and described with reference to the examples herein. By way of example only, the optional configurable logic 36 may comprise one or more of field programmable gate arrays (FPGAs), field programmable logic devices (FPLDs), application specific integrated circuits (ASICs) and/or programmable logic units (PLUs).

Although examples of the application management computing device 12, the license server 14 and the client computing devices 16(1)-16(n) are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
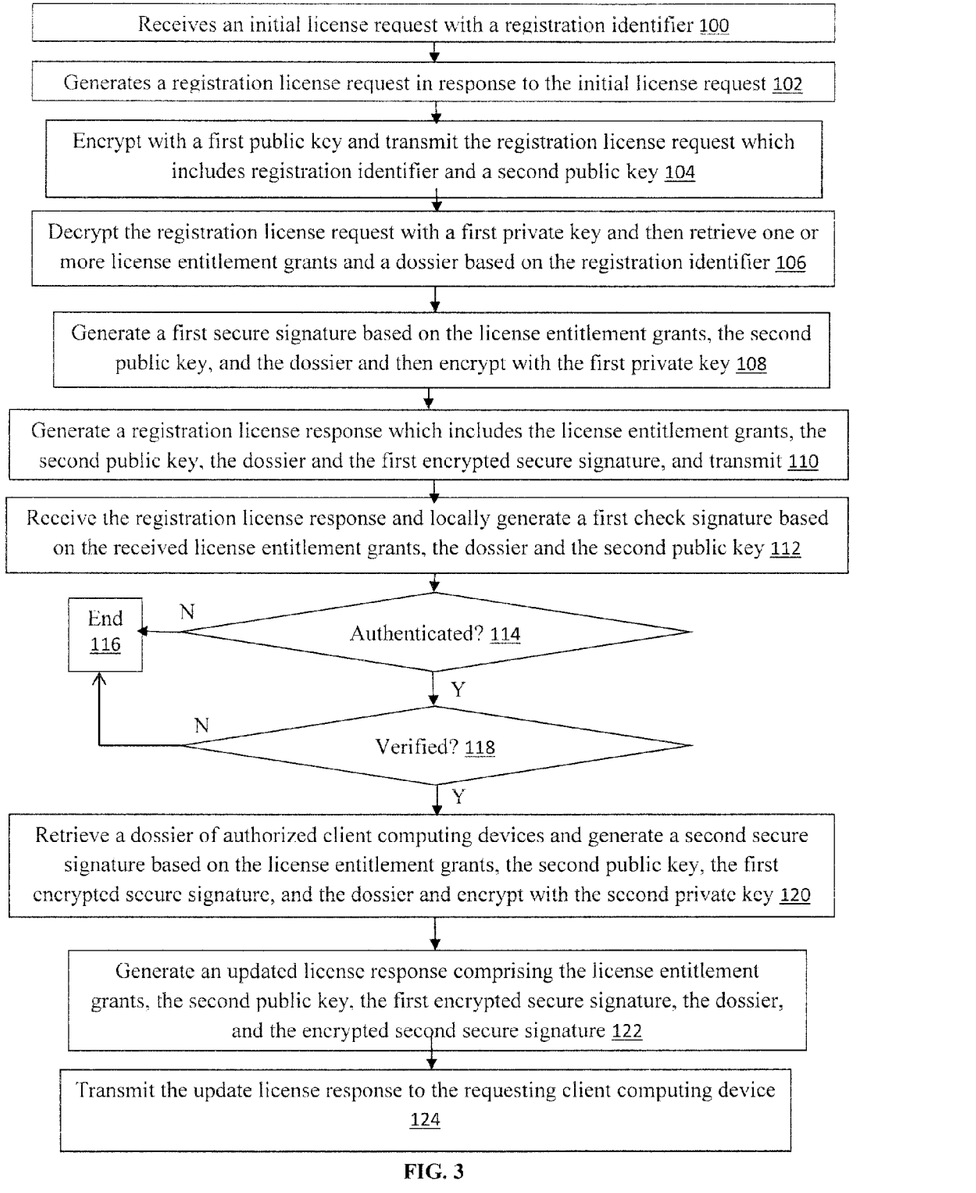
FIG. 3 is a flowchart of an example of a method for securing one or more entitlement grants with an application management computing device.
Figure 5:
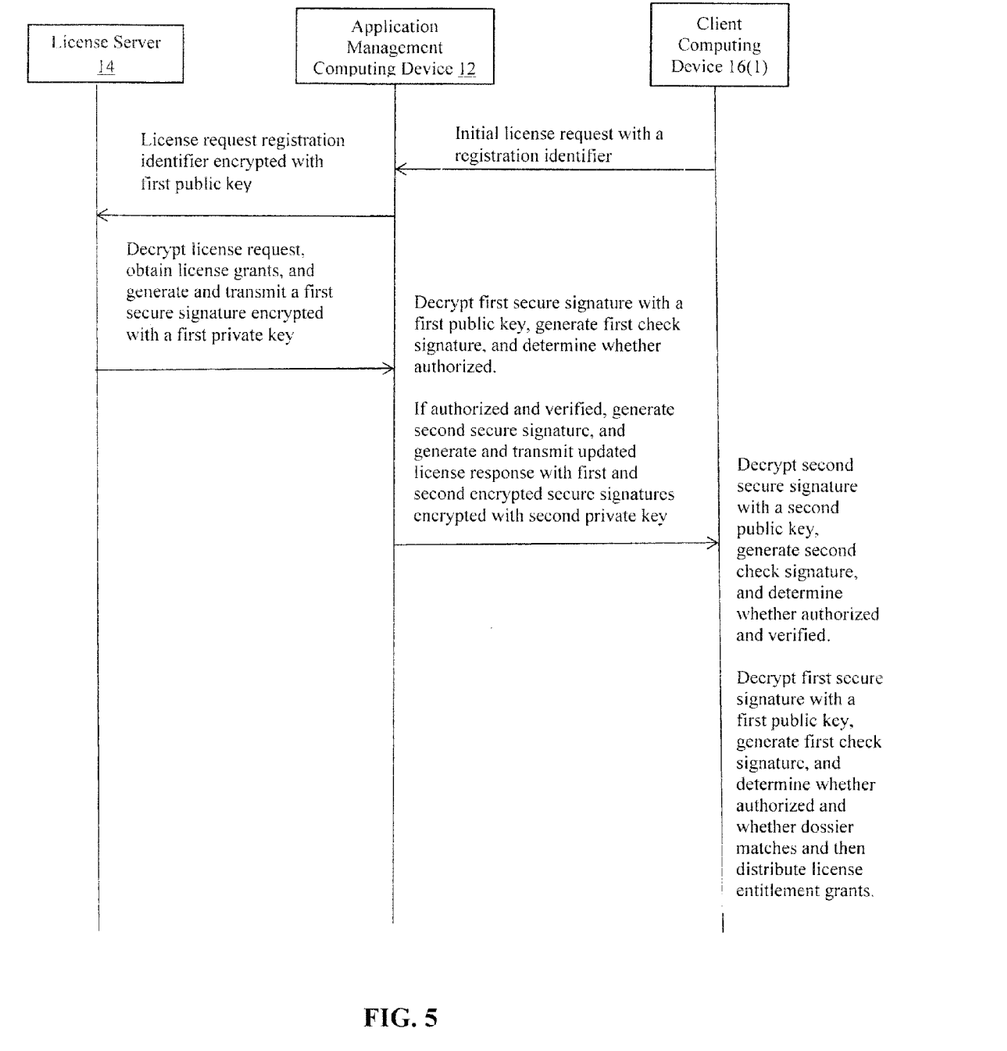
FIG. 5 is a timing diagram of the method for securing one or more entitlement grants illustrated in FIGS. 4 and 5.

An example of a method for securing one or more entitlement grants with an application management computing device 12 will now be described with reference to FIGS. 1-3 and 5. Referring more specifically to FIGS. 3 and 5, in this example in step 100, the application management computing device 12 receives an initial license request with a registration identifier from one of the plurality client computing devices 16(1)-16(n), although the initial license request with the registration identifier that identifies what one or more licenses have been acquired could be received from other devices, such as from a management computing device that manages traffic, applications, and/or operations for the plurality of the client computing devices 16(1)-16(n) by way of example only.

In step 102, in response to the received initial license request with the registration identifier, the application management computing device 12 generates a registration license request for one or more license entitlement grants from the license server 14. In this example, the registration license request generated by the application management computing device 12 includes the registration identifier and a second public key, although the registration license request could include other types and/or amounts of other information, such as a second private key by way of example only.

In step 104, the application management computing device 12 encrypts the registration license request and a second public key with a first public key and then transmits the encrypted registration license request to the license server 14, although the registration license request can be secured in other manners and/or transmitted to other devices managing license entitlement grants. In this particular example, the license server 14 is in secure location separate from the application management computing device 12 which may by way of example be deployed only at a customer site where the client computing devices 16(1)-16(n) are located, although other configurations could be used. Additionally, in these examples the private and public keys could be in other locations, such as in reverse locations.

In step 106, the license server 14 decrypts the registration license request received from the application management computing device with a first private key to obtain the registration identifier and the second public key, although the license server 14 could obtain any other necessary information and/or perform other operations. Next, the license server 14 retrieves one or more license entitlement grants associated with the obtained registration identifier, although the license server 14 could obtain other information and/or perform other types and/or numbers of other additional operations. Additionally, the license server 14 retrieves a dossier of the one or more authorized client computing devices 16(1)-16(n) for each of the retrieved license entitlement grant(s) and locks the retrieved dossier to the requesting application management computing device 12, although other types and/or amounts of other information could be obtained.

In step 108, the license server 14 generates a first secure signature using a hash sum of the one or more retrieved license entitlement grants, the retrieved dossier and the second public key, although the first secure signature can be generated in other manners and based on other types and/or amounts of information, such as other combinations of more or less of the one or more retrieved license entitlement grants, the retrieved dossier and/or the second public key could be used. The license server 14 encrypts the first secure signature with a first private key, although other approaches for securing the first signature could be used.

In step 110, the license server 14 generates a registration license response which includes the one or more retrieved license entitlement grants, the dossier, the second public key, and the first encrypted secure signature, although the registration license response can include other types and/or amounts of information. Once the registration license response is generated, the license server 14 transmits the registration license response to the application management computing device 12, although the response could be transmitted to other types of devices which are involved in securing the license entitlement grants.

In step 112, the application management computing device 12 receives the registration license response and locally generates the first check signature based on the retrieved license entitlement grants and the dossier which are in the received registration license response from the license server 14 and the second public key which the application management computing device 12 already has obtained from memory 22 or from another storage location, although other approaches could be used. In this particular example, the application management computing device 12 locally generates the first check signature using a hash sum of the retrieved license entitlement grants, the dossier and the second public key, although like the first secure signature, the first check signature also can be generated in other manners and based on other types and/or amounts of information.

In step 114, the application management computing device 12 decrypts the first encrypted secure signature with the first public key and determines if there is authentication based on a comparison of the decrypted first secure signature against the locally generated first check signature to see if they match. If the application management computing device 12 determines there is not a match, then the No branch is taken to step 116 and the one or more license entitlement grants are not provided and in this particular example the method ends. If in step 114 the application management computing device 12 determines there is a match, then the Yes branch is taken to step 118.

In step 118, the application management computing device 12 determines if the dossier in the received registration license response from the license server matches the dossier obtained from decrypting the first encrypted signature to determine if there is a match, although other approaches for verifying the dossier can be used. If in step 118 there is not a match, then the No branch is taken to step 118 where this particular example of the method ends. If in step 118 there is a match, then there is verification and the Yes branch is taken to step 120, although other approaches for obtaining verification can be used.

In step 120, the application management computing device 12 generates a second secure signature based on the license entitlement grants, the second public key, the first encrypted secure signature, and another dossier with a list of the specific one of the client computing devices 16(1)-16(n) for a particular license entitlement grant(s), although the second secure signature can be generated in other manners and based on other types and/or amounts of information. In this particular example, the application management computing device 12 uses a hash sum of the license entitlement grants, the second public key, the first encrypted secure signature, and the dossier to generate the second secure signature, although again the second secure signature can be generated in other manners and based on other types and/or amounts of information, such as optional additional entitlements. Once the second secure signature is generated, the application management computing device 12 encrypts the second secure signature with a second private key.

In step 122, the application management computing device 12 generates a supplemental license response comprising the one or more entitlement grants, the second public key, the first secure signature, the dossier from the license server 14, the dossier from step 120 above, and the second secure signature to be transmitted to the specific one of the client computing devices 16(1)-16(n), although the response could have other types and/or amounts of information could be used and/or could be transmitted to other devices, such as a management computing device which manages the operation of the client computing devices 16(1)-16(n) by way of example only.

In step 124, the application management computing device 12 transmits the generated supplemental license response to the specific one of the client computing devices 16(1)-16(n), although the client computing devices could for example have received a license unsolicited by the application management computing device (a push operation).

Figure 4:
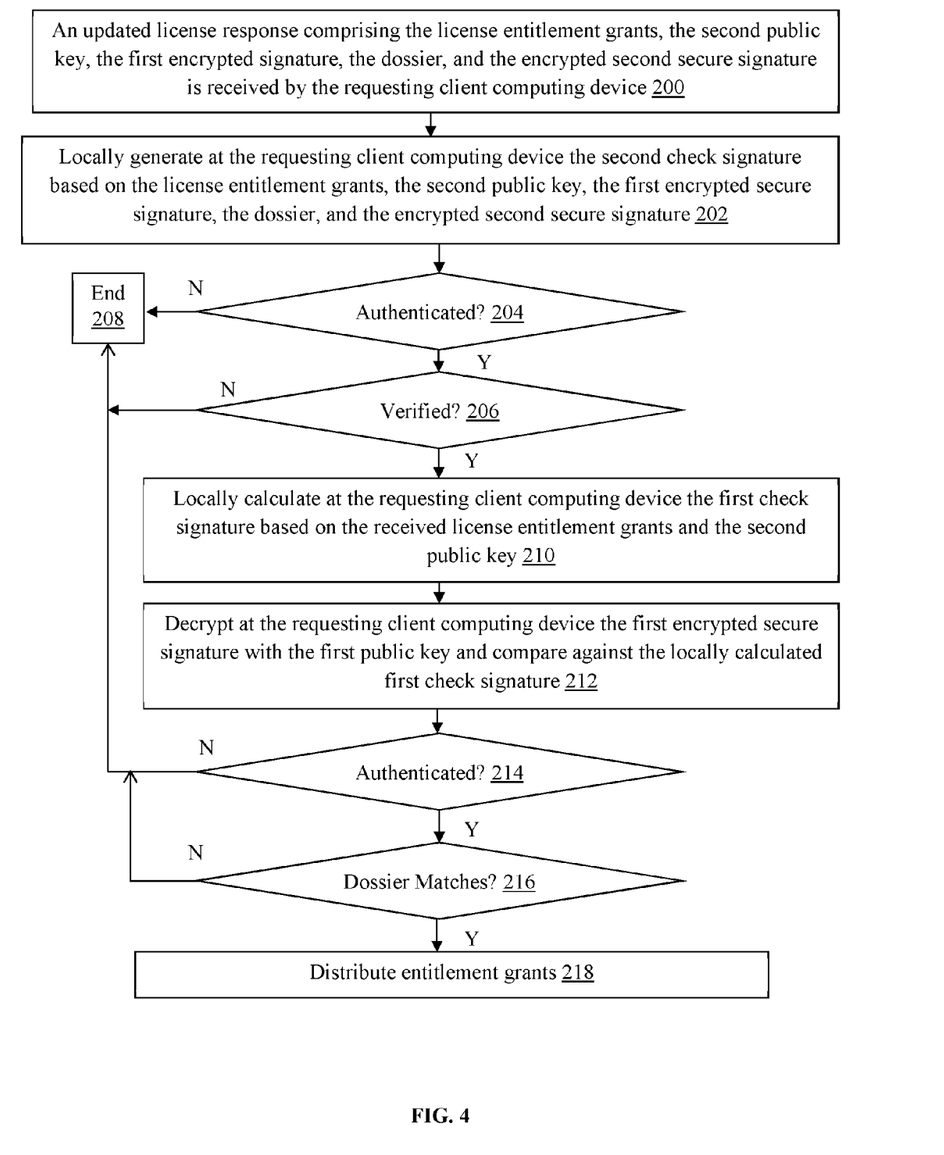
FIG. 4 is a flowchart of an example of a method for securing one or more entitlement grants with one of the client computing devices.

An example of a method for securing one or more entitlement grants with one of the client computing devices 16(1)-16(n) will now be described with reference to FIGS. 1-2, 4 and 5. Referring more specifically to FIGS. 4 and 5, in step 200 an updated license response comprising the one or more entitlement grants, the second public key, the first secure signature, the dossier from the license server 14, the dossier from step 120, and the second secure signature is received and decrypted with the second public key by the specific one of the client computing devices 16(1)-16(n), although other types of devices could receive the response and process as described with the example herein, such as a management computing device that manages traffic, applications, and/or operations for the plurality of the client computing devices 16(1)-16(n) by way of example only.

In step 202, the specific one of the client computing devices 16(1)-16(n) locally generates a second check signature based on the license entitlement grants, the second public key, the first encrypted secure signature, and the dossier from step 120 received from the application management computing device 12 in the updated license response, although the second check signature can be generated in other manners and based on other types and/or amounts of information, such as with the dossier from the license server 14 by way of example only. In this particular example, the specific one of the client computing devices 16(1)-16(n) uses a hash sum of the license entitlement grants, the second public key, the first encrypted secure signature, and the dossier from step 120 to generate the second check signature, although again the second check signature can be generated in other manners and based on other types and/or amounts of information.

In step 204, the specific one of the client computing devices 16(1)-16(n) decrypts the second secure signature with a second public key and determines authentication based on a comparison of the decrypted second secure signature against the locally generated second check signature for a match. If the decrypted second signature and the locally generated second signature do not match, then there is no authentication and the No branch is taken to step 208 where this particular example of the method ends. If the decrypted second signature and the locally generated second signature do match, then there is authentication and the Yes branch is taken to step 206.

In step 206, the specific one of the client computing devices 16(1)-16(n) determines if there is integrity based on a comparison for a match of the dossier from step 120 obtained from the decrypted second secure signature against dossier from step 120 received in the response by the specific one of the client computing devices 16(1)-16(n). If there is no match, then there is no integrity and the No branch is taken to step 208 where this particular example of the method ends. If there is a match, then there is authentication and the Yes branch is taken to step 210.

In step 210, the initially requesting one of the client computing devices 16(1)-16(n) locally generates the first check signature based on the retrieved license entitlement grants in the registration license response, the dossier received from the license server 14 and the second public key, although other approaches could be used. In this particular example, the initially requesting one of the client computing devices 16(1)-16(n) locally generates the first check signature using a hash sum of the retrieved license entitlement grants, the dossier received from the license server 14, and the second public key, although the first check signature can be generated in other manners and based on other types and/or amounts of information.

In step 212, the first encrypted secure signature is decrypted with the first public key by the initially requesting one of the client computing devices 16(1)-16(n). Next, the initially requesting one of the client computing devices 16(1)-16(n) compares the decrypted first secure signature against the locally generated first check signature from step 210.

In step 214, the initially requesting one of the client computing devices 16(1)-16(n) determines if there is authentication based on the comparison of the decrypted first secure signature and the locally generated first check signature to determine if there is match. If the initially requesting one of the client computing devices 16(1)-16(n) determines that decrypted first secure signature does not match the locally generated first check signature then there is no authentication and no integrity (that is, the contents have been tampered with) and the No branch is taken to step 208 where the one or more license entitlement grants are not provided and this particular example of the method ends. If the initially requesting one of the client computing devices 16(1)-16(n) determines that the decrypted first secure signature does match the locally generated first check signature then there is authentication and integrity (contents are not tampered with) and the Yes branch is taken to step 216. When the Yes branch is taken, it indirectly validates the integrity of the second secure public key used to validate the second check signature from the license server through the application management computing device.

In step 216, the initially requesting one of the client computing devices 16(1)-16(n) determines if the specific one of the client computing devices 16(1)-16(n) matches one on the list of authorized users in the dossier. If specific one of the client computing devices 16(1)-16(n) is not on the list in the dossier, then the No branch is taken to step 208 and this particular method ends. If the specific one of the client computing devices 16(1)-16(n) is the same as one of the authorized client computing device(s) on the list in the dossier, then the Yes branch is taken and then in step 218 the license entitlement grant(s) are provided, i.e. verified, for the authorized one of the client computing device(s) 16(1)-16(n) and this particular example of the method can end.

As illustrated and described by way of the examples herein, this technology provides methods, non-transitory computer readable media, and devices that more effectively secure one or more license entitlement grants. Additionally, this technology enables a customer side product that needs to serve as a second tier licensing entity to provide tamper-free product/instance licenses. This technology also adds another level of security using private and public keys in manners that prevents the key from being replaced in order to alter the license entitlements in the customer premises without requiring any additional communication with the license server beyond what is currently needed, e.g., one per license activation. Further, this technology is able to log and monitor information, e.g. any attempts to tamper with the license entitlements, use of invalid keys, or an invalid dossier, for the purpose of auditing for any potential breach, attempted breach, or actual breach of security.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for securing one or more entitlement grants, the method comprising:
    transmitting, by an application management computing device, a registration license request encrypted with a first public key to a license server, the registration license request comprising a registration identifier and a second public key;
    receiving, by the application management computing device, a registration license response from the license server, the registration license response comprising one or more license entitlement grants, the second public key, and a first secure signature encrypted with a first private key, the first secure signature is based on at least the one or more license entitlement grants;
    generating, by the application management computing device, a first check signature based on at least the one or more license entitlement grants and the second public key;
    decrypting, by the application management computing device, the first encrypted secure signature with the first public key to obtain the first decrypted secure signature; and
    authenticating and proving integrity, by the application management computing device, of the one or more license entitlement grants when the first decrypted secure signature matches the first check signature.

2. The method of claim 1 wherein the first secure signature and the first check signature are each further based on the second public key and are each a hash sum of at least the one or more license entitlement grants and the second public key.

3. The method of claim 1 further comprising adding, by the application management computing device, a dossier of one or more authorized client devices to a supplemented license response.

4. The method of claim 3 further comprising:
    generating, by the application management computing device, a second signature based on at least the one or more license entitlement grants and the dossier;
    encrypting, by the application management computing device, the second signature with a second private key; and adding, by the application management computing device, the second signature to the supplemental license response.

5. The method of claim 4 wherein the generating the second signature is further based on the second public key and the first check signature.

6. The method of claim 4 further comprising transmitting, by the application management computing device, the supplemental license response in response to an initial license request with the registration identifier.

7. An application management computing apparatus, comprising programmed instructions stored thereon and one or more processors configured to be capable of executing the stored programmed instructions to:
   transmit a registration license request encrypted with a first public key to a license server, the registration license request comprising a registration identifier and a second public key;
   receive a registration license response from the license server, the registration license response comprising one or more license entitlement grants, the second public key, and a first secure signature encrypted with a first private key, the first secure signature is based on at least the one or more license entitlement grants;
   generate a first check signature based on at least the one or more license entitlement grants and the second public key;
   decrypt the first encrypted secure signature with the first public key to obtain the first decrypted secure signature; and
   authenticate and provide integrity, by the application management computing device, of the one or more license entitlement grants when the first decrypted secure signature matches the first check signature.

8. The apparatus of claim 7 wherein the first secure signature and the first check signature are each further based on the second public key and are each a hash sum of at least the one or more license entitlement grants and the second public key.

9. The apparatus of claim 7 wherein the one or more processors are further configured to be capable of executing the stored programmed instructions to add a dossier of one or more authorized client devices to a supplemented license response.

10. The apparatus of claim 9 wherein the one or more processors are further configured to be capable of executing the stored programmed instructions to:
    generate a second signature based on at least the one or more license entitlement grants and the dossier;
    encrypt the second signature with a second private key; and
    add the second signature to the supplemental license response.

11. The apparatus of claim 10 wherein the generating the second signature is further based on the second public key and the first check signature.

12. The apparatus of claim 10 wherein the one or more processors are further configured to be capable of executing the stored programmed instructions to transmit the supplemental license response in response to an initial license request with the registration identifier.

13. A non-transitory computer readable medium having stored thereon instructions for securing one or more entitlement grants comprising machine executable code which when executed by one or more processors, causes the one or more processors to:
   transmit a registration license request encrypted with a first public key to a license server, the registration license request comprising a registration identifier and a second public key;
   receive a registration license response from the license server, the registration license response comprising one or more license entitlement grants, the second public key, and a first secure signature encrypted with a first private key, the first secure signature is based on at least the one or more license entitlement grants;
   generate a first check signature based on at least the one or more license entitlement grants and the second public key;
   decrypt the first encrypted secure signature with the first public key to obtain the first decrypted secure signature; and
   authenticate and provide integrity of the one or more license entitlement grants when the first decrypted secure signature matches the first check signature.

14. The medium of claim 13 wherein the first secure signature and the first check signature are each further based on the second public key and are each a hash sum of at least the one or more license entitlement grants and the second public key.

15. The medium of claim 13 wherein the executable code when executed by the one or more processors further causes the one or more processors to:
    add a dossier of one or more authorized client devices to a supplemented license response.

16. The medium of claim 15 wherein the executable code when executed by the one or more processors further causes the one or more processors to:
    generate a second signature based on at least the one or more license entitlement grants and the dossier;
    encrypt the second signature with a second private key; and
    add the second signature to the supplemental license response.

17. The medium of claim 16 wherein the generating the second signature is further based on the second public key and the first check signature.

18. The medium of claim 16 wherein the executable code when executed by the one or more processors further causes the one or more processors to:
    transmit the supplemental license response in response to an initial license request with the registration identifier.

19. An application management system, comprising one or more application management apparatuses, client devices, or server devices, the application management system comprising memory comprising programmed instructions stored thereon and one or more processors configured to be capable of executing the stored programmed instructions to:
   transmit a registration license request encrypted with a first public key to a license server, the registration license request comprising a registration identifier and a second public key;
   receive a registration license response from the license server, the registration license response comprising one or more license entitlement grants, the second public key, and a first secure signature encrypted with a first private key, the first secure signature is based on at least the one or more license entitlement grants;
   generate a first check signature based on at least the one or more license entitlement grants and the second public key;

decrypt the first encrypted secure signature with the first public key to obtain the first decrypted secure signature; and authenticate and proving integrity, by the application management computing device, of the one or more license entitlement grants when the first decrypted secure signature matches the first check signature.

20. The system of claim 19 wherein the first secure signature and the first check signature are each further based on the second public key and are each a hash sum of at least the one or more license entitlement grants and the second public key.

21. The system of claim 19 wherein the one or more processors are further configured to be capable of executing the stored programmed instructions to add a dossier of one or more authorized client devices to a supplemented license response.

22. The system of claim 21 wherein the one or more processors are further configured to be capable of executing the stored programmed instructions to generate a second signature based on at least the one or more license entitlement grants and the dossier;

encrypt the second signature with a second private key; and add the second signature to the supplemental license response.

23. The system of claim 22 wherein the generating the second signature is further based on the second public key and the first check signature.

24. The system of claim 22 wherein the one or more processors are further configured to be capable of executing the stored programmed instructions to transmit the supplemental license response in response to an initial license request with the registration identifier.

\* \* \* \* \*